United States Patent [19]

Statz et al.

[11] Patent Number: 4,606,523
[45] Date of Patent: Aug. 19, 1986

[54] CUP HOLDER

[76] Inventors: Robert E. Statz, 8528 Antietam Rd., 22110; Wayne A. Treichel, 9910 Lake Occoquan Ave., both of Manassas, Va.

[21] Appl. No.: 444,996

[22] Filed: Nov. 29, 1982

[51] Int. Cl.$^4$ .............................................. A47G 29/00
[52] U.S. Cl. .................................. 248/311.2; D7/70; 211/74; 220/85 H; 248/DIG. 12
[58] Field of Search ............ 248/DIG. 12, 214, 311.2, 248/313; 211/71, 74, 75; D7/70, 71; 220/85 H

[56] References Cited

U.S. PATENT DOCUMENTS

| | | | |
|---|---|---|---|
| D. 203,942 | 3/1966 | Trombley | D7/70 |
| D. 226,623 | 4/1973 | Shuford . | |
| D. 271,073 | 10/1983 | Field | D7/70 |
| 2,666,310 | 1/1954 | Hill | 248/DIG. 12 X |
| 2,719,414 | 10/1955 | Davis | D7/70 X |
| 2,823,004 | 2/1958 | Mellon . | |
| 2,979,301 | 4/1961 | Reveal . | |
| 3,458,164 | 7/1969 | Massey | 220/85 H |
| 3,532,318 | 10/1970 | Lloyd . | |
| 3,592,501 | 7/1971 | Stokes et al. | 220/85 H X |
| 3,707,272 | 12/1972 | Rasmussen . | |
| 3,840,204 | 10/1974 | Thomas et al. | 248/311.2 |

Primary Examiner—J. Franklin Foss
Assistant Examiner—David L. Talbott
Attorney, Agent, or Firm—Nies, Webner, Kurz & Bergert

[57] ABSTRACT

A molded plastic cup holder has a hollow generally cylindrical socket for receiving the lower portion of a relatively large drinking cup and a supporting hook adapted to engage over a rail or an automobile door. On the shank of the hook, above the socket, are a pair of forwardly extending springy arcuate arms adapted to yieldably embrace the upper portion of the cup.

1 Claim, 3 Drawing Figures

CUP HOLDER

FIELD OF THE INVENTION

Brackets, article holding means, receptacle type in class 248, subclass 311.

OBJECTS

Fast-food vendors and drive-ins dispense beverages in paper or plastic drinking cups for which there is presently no adequate holder in which a cup of either size may be supported on a rail or automobile door, and a particular need is such a holder which the user may grasp for lifting and tipping up a cup when he desires to drink the beverage. Because the drinking cups may be of various sizes, with consequent variable diameters, a holder comprising a socket alone is unsatisfactory because a cup may fit in it too tightly or too loosely, the latter with unfortunate results when the customer tips it up to his lips. The object now is to provide a drinking cup holder which provides not only a cylindrical or frusto-conical hollow socket for receiving the lower portion of a drinking cup, but also a pair of arcuate springy arms which resiliently embrace the upper portion of the cup. Because of the resilience of the arms, a cup of relatively large diameter may be engaged by passing it downwardly through the arms until the bottom of the cup rests upon the bottom of the socket and because the arms are resilient and disposed along arcs of a circle of lesser diameter than the top of the socket, a drinking cup even of relatively small diameter will be firmly held by the arms.

A further object is to provide in the cup holder a means for holding not only relatively large diameter cups but also relatively small ones. To this end it is proposed now to provide a cup holder having a hollow cylindrical frusto-conical socket for accomodating the lower portion of a relatively large diameter cup wherein the socket has a bottom with an aperture into which a smaller diameter cup, normally of frusto-conical shape, may engage and, furthermore, a notch in the front of the socket (the hook being on the rear) so that the user's lips can reach through to the cup engaged in the aperture.

These and other objects will be apparent from the following specifications and drawing in which.

Figure 1:
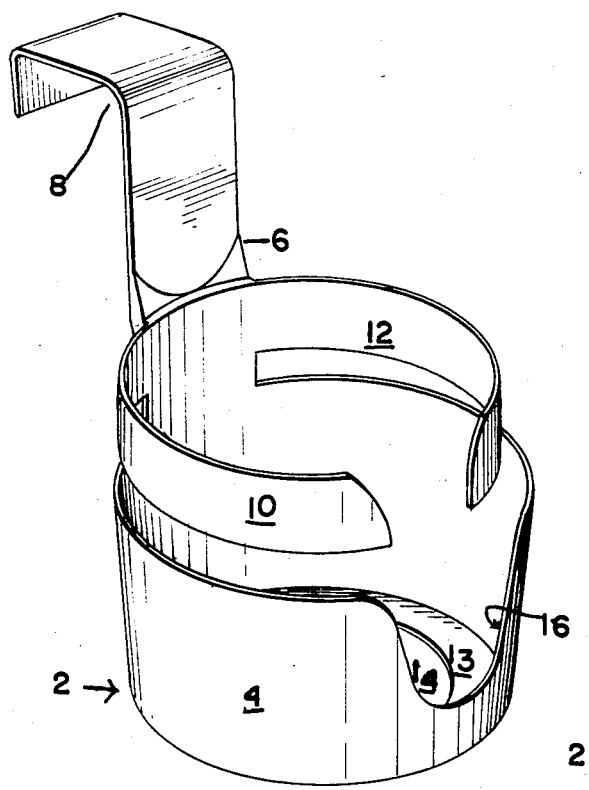
FIG. 1 is a perspective view of the cup holder.
Figure 2:
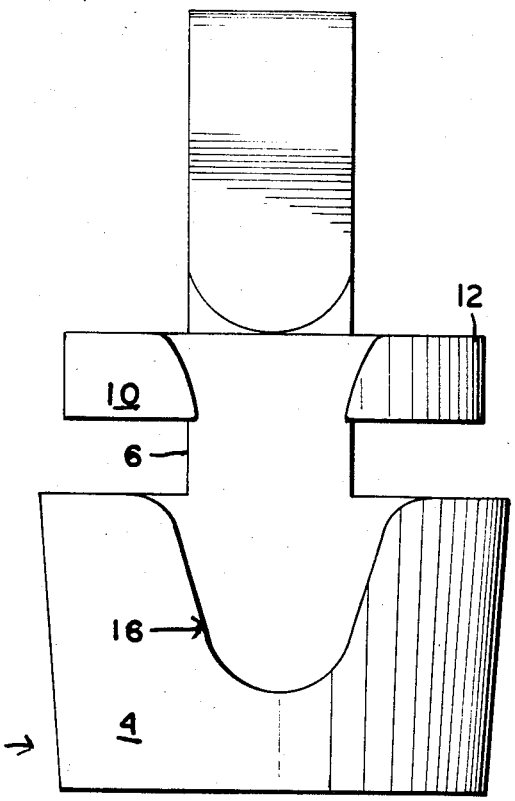
FIG. 2 is a front elevation of the cup holder.
Figure 3:
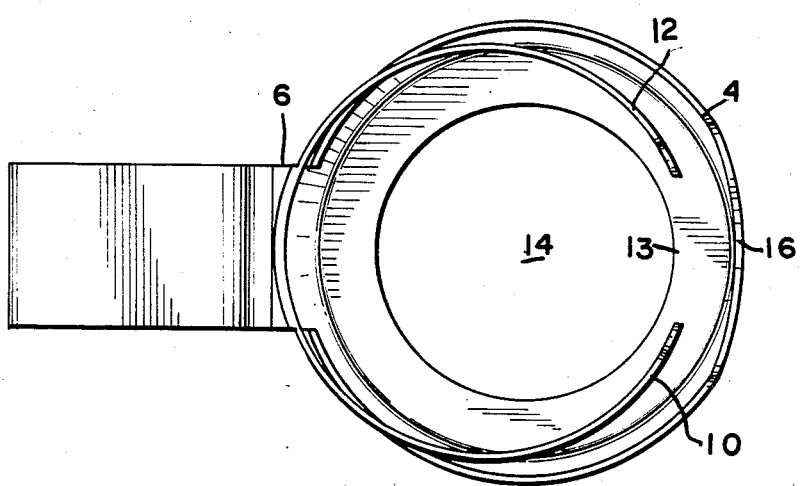
FIG. 3 is a top plane view of the cup holder.

Referring now to the drawings, the cup holder 2 is preferably formed of molded plastic and consists of a hollow cylindrical, preferably frusto-conical, socket from the rear of which ascends the shank 6 of a hook 8 shaped to engage over a rail or an automobile door. Reaching forwardly from the hook shank 6 are a pair of semi-cylindrical resilient arms 10 disposed along the arc of a circle which is preferably of smaller diameter than the top of the socket so that, when a paper or plastic drinking cup is engaged downwardly through the arms into the socket, the arms will be somewhat flexed outwardly so as to grasp the side wall of the cup.

The socket has an annular bottom flange 3 which surrounds an aperture 14 into which a cup of relatively smaller diameter may engage, and at the front of socket 4 is an enlarged upwardly-open notch 16 through which the user's lips may reach when he desires to drink out of a cup engaged in aperture 14.

The uses for a cup holder of the type described herein are well-known, particular advantage being afforded when handling a large thin-wall drinking cup which may be subject to distortion when grasped manually by the user, or where the drinking cup contains hot beverage, it being best not then to grab the cup itself. If the cup be large, it is inserted downwardly between the arms 10 and 12 so as to flex the arms slightly outwardly and until the cup engages in socket 4 at rest on the bottom flange 12. Thereupon the cup and its contents can be consumed by grasping the holder 4 and tipping the cup to the user's lips. In the case of a relatively small cup, the latter is passed downwardly through the spring arms 10 and 12 and into the aperture 14 in the bottom of socket 4, in which position the user's lips may reach the cup brim through the notch 16.

I claim:

1. A drinking cup holder comprising a hollow upwardly open socket having a generally cylindrical side wall with front and rear sides and a top and bottom, a hook having a shank extending upwardly from the rear side of the socket side wall, said hook shank being integral with and extending upwardly from the rear side of the socket, and a pair of flexibly resilient arms extending forwardly from the hook shank, said arms being spaced upwardly from and over-lying the socket, said arms when unflexed being normally disposed along the arc of a circle of lesser diameter than the top of the socket, said socket having at the bottom of the side wall thereof an inwardly-extending annular flange defining an aperture for receiving a generally frusto-conical drinking cup, said socket having in the front of the side wall thereof an upwardly open notch which notch extends downwardly from the upper edge of the socket and which terminates above the bottom of the socket providing access of the user's lips to a cup engaged in said aperture.

* * * * *